July 24, 1923.
H. T. SPENCER
1,462,773
INSECT POWDER BLOWER OF THE BELLOWS TYPE
Filed April 1, 1922
2 Sheets-Sheet 1
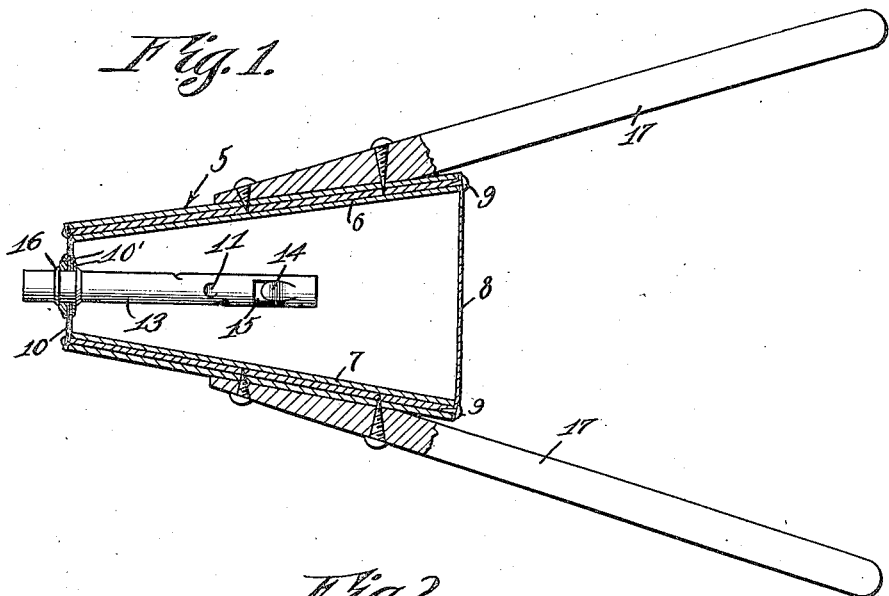
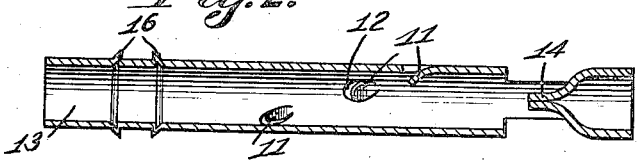
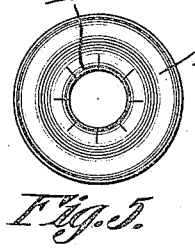
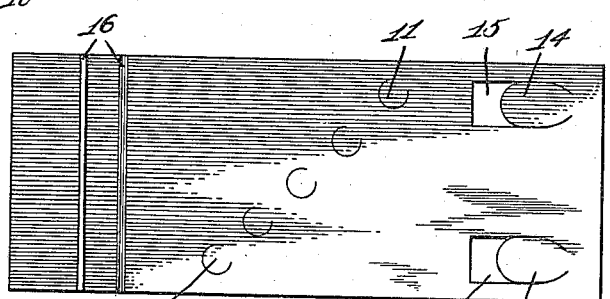
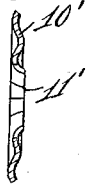
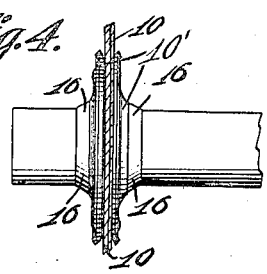
H.T. Spencer Inventor
By Chrow & Co.
Attorneys July 24, 1923.
H. T. SPENCER
1,462,773
INSECT POWDER BLOWER OF THE BELLOWS TYPE
Filed April 1, 1922    2 Sheets-Sheet 2
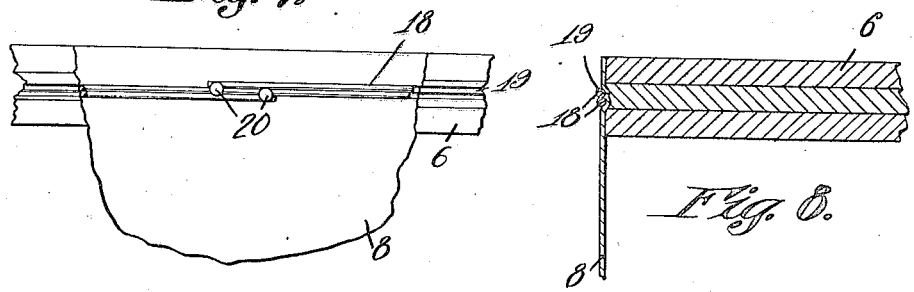
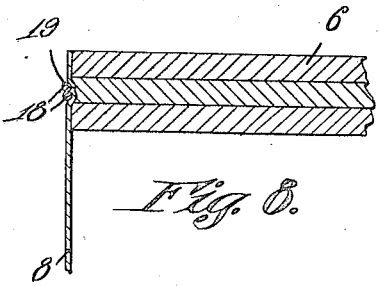
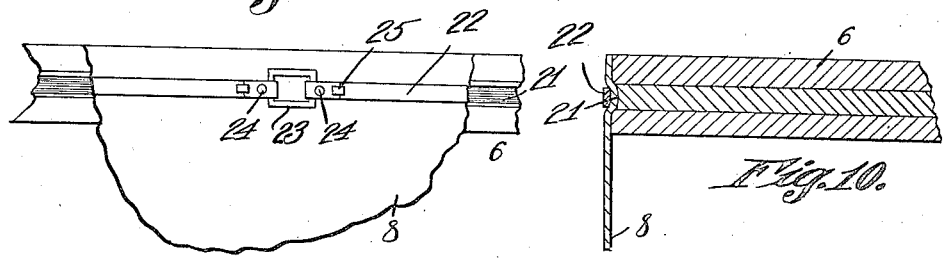
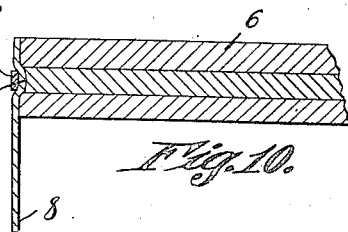
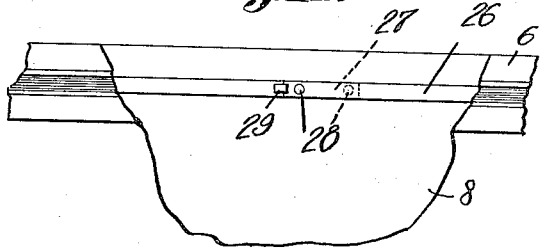
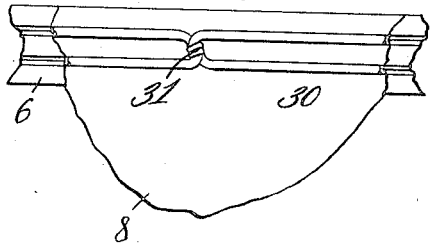
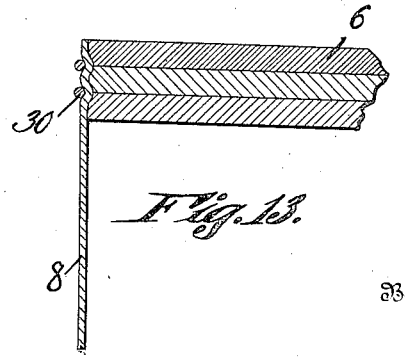
H. T. Spencer Inventor
By [signature] Attorney Patented July 24, 1923.

1,462,773

UNITED STATES PATENT OFFICE.

HORACE T. SPENCER, OF KNOXVILLE, TENNESSEE.

INSECT-POWDER BLOWER OF THE BELLOWS TYPE.

Application filed April 1, 1922. Serial No. 548,669.

*To all whom it may concern:*

Be it known that I, HORACE T. SPENCER, a citizen of the United States, residing at Knoxville, in the county of Knox and State of Tennessee, have invented a new and useful Insect-Powder Blower of the Bellows Type, of which the following is a specification.

This invention has reference to insect powder blowers, the primary object of the invention being to provide novel means for discharging the powdered material from the body portion of the blower or bellows, so that the material will take a swirling motion to insure the same being properly distributed.

Another object of the invention is to provide means for securing the discharge tube within the body portion of the blower, whereby the tube will be held in spaced relation with the walls of the blower.

A still further object of the invention is to provide novel and inexpensive means for securing the flexible walls of the blower to the body portion of the blower.

With the foregoing and other objects in view which will appear as the description proceeds, the invention resides in the combination and arrangement of parts and in the details of construction hereinafter described, and claimed, it being understood that changes in the precise embodiment of the invention herein disclosed, may be made within the scope of what is claimed, without departing from the spirit of the invention.

Referring to the drawings:

Figure 1 is a sectional view through the body portion of a bellows constructed in accordance with the present invention;

Figure 2 is a sectional view through a discharge tube;

Figure 3 is a discharge tube blank prior to the bending of the same into shape;

Figure 4 is a detail of the tube securing means;

Figure 5 is an elevational view of the washer forming a part of the invention;

Figure 6 is a sectional view through the washer;

Figure 7 is a fragmental elevational view disclosing a method and means for securing the flexible member to the body portion.

Figure 8 is a sectional view thereof.

Figure 9 is a fragmental elevational view of a further modified form of securing means.

Figure 10 is a sectional view thereof.

Figure 11 discloses further forms of securing means.

Figure 12 discloses further forms of securing means.

Figure 13 discloses further forms of securing means.

Referring to the drawings in detail, the body portion of the bellows is formed preferably of ply wood material, but it is to be understood that the material of which the body portion is made, may be of any light substance, to render the device easily operated.

The body portion which is indicated at 5, embodies opposed sections 6 and 7, which sections are connected at their ends by means of a strip of leather, or other flexible element, as indicated at 8, the strip of leather being secured to the sections 6 and 7 as by the securing means indicated at 9.

The discharge tube which forms an important feature of the invention is formed of a sheet of comparatively thin metal, the same being passed through a suitable machine to form tongues 11 that are arranged in the blank diagonally, as shown by Figure 3 of the drawings. These tongues 11 are stamped from the body portion of the blank and are bent inwardly providing openings 12 to admit material to pass into the discharge tube, which is indicated at 13.

Adjacent to one end of the blank, are spaced tongues 14, which are also stamped from the blank, to provide openings 15, the tongues 14 being brought together in a manner as shown by Figure 2 of the drawings to direct air and material to the interior of the tube.

Formed in the blank adjacent to one end thereof, are the transversely extending ribs 16 disposed in spaced relation with each other and constructed so that they will form circular enlargements on the tube when the blank is formed into a tube.

The washer which is shown more particularly by Figures 5 and 6 of the drawings, is formed with a central opening, the wall of the opening extending laterally as shown by Figures 6 of the drawings, where the same is split to provide fingers 11' to grip the discharge tube 13 when the same is positioned thereon. In order that the washer will be exceptionally strong and will be possessed with sufficient resiliency to efficiently grip the article secured thereby, circular corrugations are formed in the washer as shown by Figure 6 of the drawings.

A suitable opening is formed in the flexible material or leather which connects the sections adjacent to the forward ends thereof, which opening is designed to accommodate a portion of the discharge tube as clearly shown by Figure 1 of the drawings. Metallic washers indicated at 10′ contact with the overlapping ends of the flexible member 10, the washers also contacting with the ribs 16 to clamp the flexible material, securing the ends together, and at the same time providing a support for the discharge tube.

As shown by Figures 7 and 8 of the drawings, the flexible element 8 is secured to the sections 6 and 7 by means of the wires 18, which wires are stretched over the section to force portions of the flexible element 8 into the grooves 19 formed in the section. While I have shown the flexible member 8 as secured to the section 6, it is to be understood that a similar connection is made between the flexible element 8 and section 7. When the wires 18 have been properly positioned, they are soldered by means of the soldering material indicated at 20.

In the form of the invention as illustrated by Figures 9 and 10 of the drawings, the section 6 is formed with a depressed portion 21, which is of a width equal to the width of the band 22 employed for securing the flexible element 8 to the section. The band is positioned over the flexible member 8 at a point where the same will force portions of flexible element 8 into the depressed portion or groove 21. The ends of the band are connected to the link member 23 where the same are secured by means of the rivets 24, the extreme ends of the bands overlying portions of the band where the same are soldered as at 25.

The band 26 as shown by Figure 11 of the drawings, has its ends overlapped as at 27, where the overlapped ends are secured by means of the rivets 28, solder being applied as at 29 for further securing the ends together.

As shown by Figure 12 of the drawings, a pair of wires 30 are employed, which wires have their ends twisted together as at 31, where the same may be twisted together in any suitable manner. Handles 17 are secured to the body portion of the blower as shown by Figure 1 of the drawings, the handles being disposed at angles to facilitate the operation of the blower, it being understood that the handles may be rounded for the convenience of the operator.

From the foregoing it will be seen that I have provided an inexpensive but efficient means for securing the flexible element to the body portion of the device.

In the use of the device, it is obvious that as the handles 17 are moved towards each other, the side portions or sections 6 and 7 of the blower, will also be moved towards each other, which movement forces material through the openings 12 and 15, the tongues 11 and 14 directing the material in a circular path throughout the length of the discharge tube 13.

It might be further stated that due to the construction of the discharge tube, lumps which may be present will be broken and discharged in a powdered form.

Having thus described the invention, what is claimed as new is:—

1. An insect powder blower comprising a body portion, a discharge tube centrally located within the body portion, said discharge tube having openings formed in the side walls thereof, tongues disposed adjacent to the openings, said tongues adapted to direct material spirally through the discharge tube, and means for operating the bellows.

2. An insect powder blower comprising a body portion, a discharge tube positioned within the body portion, said tube having openings formed in spaced relation with each other and disposed spirally of the tube, means adjacent to the opening for directing material in a spiral path through the tube, and means for operating the bellows.

3. An insect powder blower comprising a body portion, a washer disposed at one end of the bellows, a discharge tube having spaced ribs, said washer adapted to grip the tube between the ribs, said tube having openings formed in spiral relation, and means adjacent to the openings for directing material to the interior of the tube.

In testimony that I claim the foregoing as my own, I have hereto affixed my signature in the presence of two witnesses.

HORACE T. SPENCER.

Witnesses:
 W. C. BAKER,
 RUTH MOORE.